June 13, 1944. C. P. GRIFFITH ET AL 2,351,503
LIQUID DISPENSING APPARATUS
Filed July 12, 1941 3 Sheets-Sheet 1

Clement P. Griffith
Walter A. Barr
INVENTORS
BY Edmund W. E. Kamm
ATTORNEY.

June 13, 1944.  C. P. GRIFFITH ET AL  2,351,503
LIQUID DISPENSING APPARATUS
Filed July 12, 1941  3 Sheets-Sheet 2

Clement P. Griffith
Walter A. Barr
INVENTORS
BY Edmund W. E. Kamm
ATTORNEY.

June 13, 1944.    C. P. GRIFFITH ET AL    2,351,503
LIQUID DISPENSING APPARATUS
Filed July 12, 1941    3 Sheets-Sheet 3

Clement P. Griffith
Walter A. Barr
INVENTORS
BY Edmund W. C. Kamm
ATTORNEY.

Patented June 13, 1944

2,351,503

UNITED STATES PATENT OFFICE 2,351,503

LIQUID DISPENSING APPARATUS

Clement P. Griffith and Walter A. Barr, Fort Wayne, Ind., assignors to S. F. Bowser & Company, Incorporated, Fort Wayne, Ind., a corporation of Indiana Application July 12, 1941, Serial No. 402,200

11 Claims. (Cl. 222—61)

This invention relates to improvements in liquid dispensing apparatus. More particularly, it relates to improvements in apparatus for dispensing liquids of a given density by displacing them with a liquid of a different density.

It is an object of the invention to provide an apparatus of the type described which is electrically controlled.

It is another object of the invention to provide an apparatus which can be readily utilized with a plurality of storage tanks.

Yet another object is the provision of auxiliary shut-off mechanism to prevent the displacement liquid from entering the dispensing lines.

Still another object of the invention is to provide means for filling individual tanks of a tank system.

It is still another object of the invention to provide remote means for delivering liquid from any of the storage tanks to any of a plurality of delivery points.

Yet another object of the invention is to provide an outlet shut-off valve which is controlled by a high water level in either the main storage tank or the separator tank.

It is another object of the invention to provide automatic filling control means for interrupting the filling operation when a low water level is reached in the supply tank.

Another object is to provide auxiliary shut-off mechanism utilizing a battery wherein the battery is relieved of load as soon as the desired function has been accomplished.

These and other objects will become apparent from a study of the specification and the drawings which form a part thereof and in which.

Mechanical system

Figure 1:
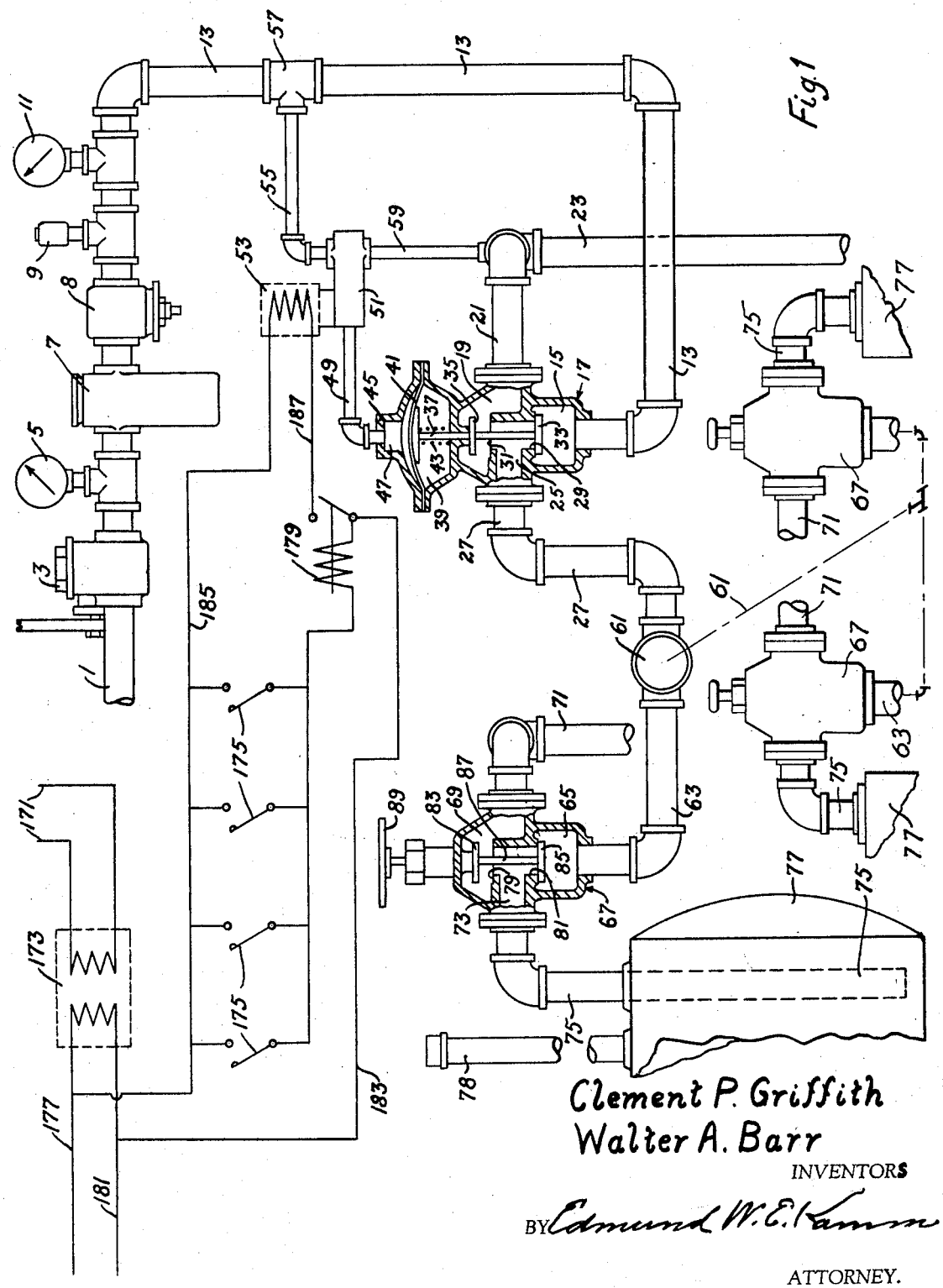
Figure 1 shows the displacement liquid controlling means.

Referring now to Figure 1, the numeral 1 indicates a pipe leading to a source of displacement liquid under pressure such as water in a water supply system, 3 is a manual shut-off valve, 5 is a pressure gauge adapted to indicate supply pressure, 7 is a strainer, 8 is a pressure reducing valve, 9 is a pressure relief valve and 11 is a second pressure gauge adapted to indicate the reduced pressure. The pipe 13 connects the apparatus just described with the inlet chamber 15 of a three-way, diaphragm operated, master valve 17. This valve is provided with an outlet chamber 19 which is connected by a pipe 21 to a waste or sewer pipe 23. The valve is also provided with an outlet passage 25 which leads to the pipe 27 and which has ports 29 and 31 which open into the chambers 15 and 19 respectively.

The valve ports 29 and 31 are controlled by poppet valves 33 and 35, respectively, which are mounted on a stem 37 which passes into a chamber 39 and is connected to be operated by a diaphragm 41 which forms one wall of the chamber. A spring 43 urges the valve stem and diaphragm upwardly. The cap 45 on the valve forms, with diaphragm 41, a chamber 47 which is connected by a pipe 49 to one outlet of a three-way valve 51 which is operated by a solenoid 53.

Valve 51 has its inlet connected by pipe 55 and T 57 to the line 13 and the other outlet is connected by a pipe 59 to the waste pipe 23. This valve is constructed so that when the solenoid is energized the chamber 47 and pipe 49 will be connected to line 13 through pipe 55 and so that when the solenoid is deenergized, the chamber 47 and pipe 49 will be connected to the waste pipe 23 by the pipe 59.

If more than one storage tank is utilized, the pipe 27 is connected to a manifold or header 61 and from this a discharge pipe 63 is connected to the inlet chamber 65 of a manually operated three-way valve 67. The outlet chamber 69 of this valve is connected to a waste pipe 71 while the outlet passage 73 is connected to a pipe 75 which enters the storage tank 77 and opens thereinto at a point adjacent the bottom of the tank. A gauging pipe 78 which is provided with a cap is connected to the top of the tank 77.

The passage 73 communicates with chamber 69 through a port 79 and with chamber 65 through a port 81. The ports 79 and 81 are controlled by poppets 83 and 85 respectively which are mounted on a valve stem 87 which in turn is connected for operation by a hand wheel 89.

Figure 2:
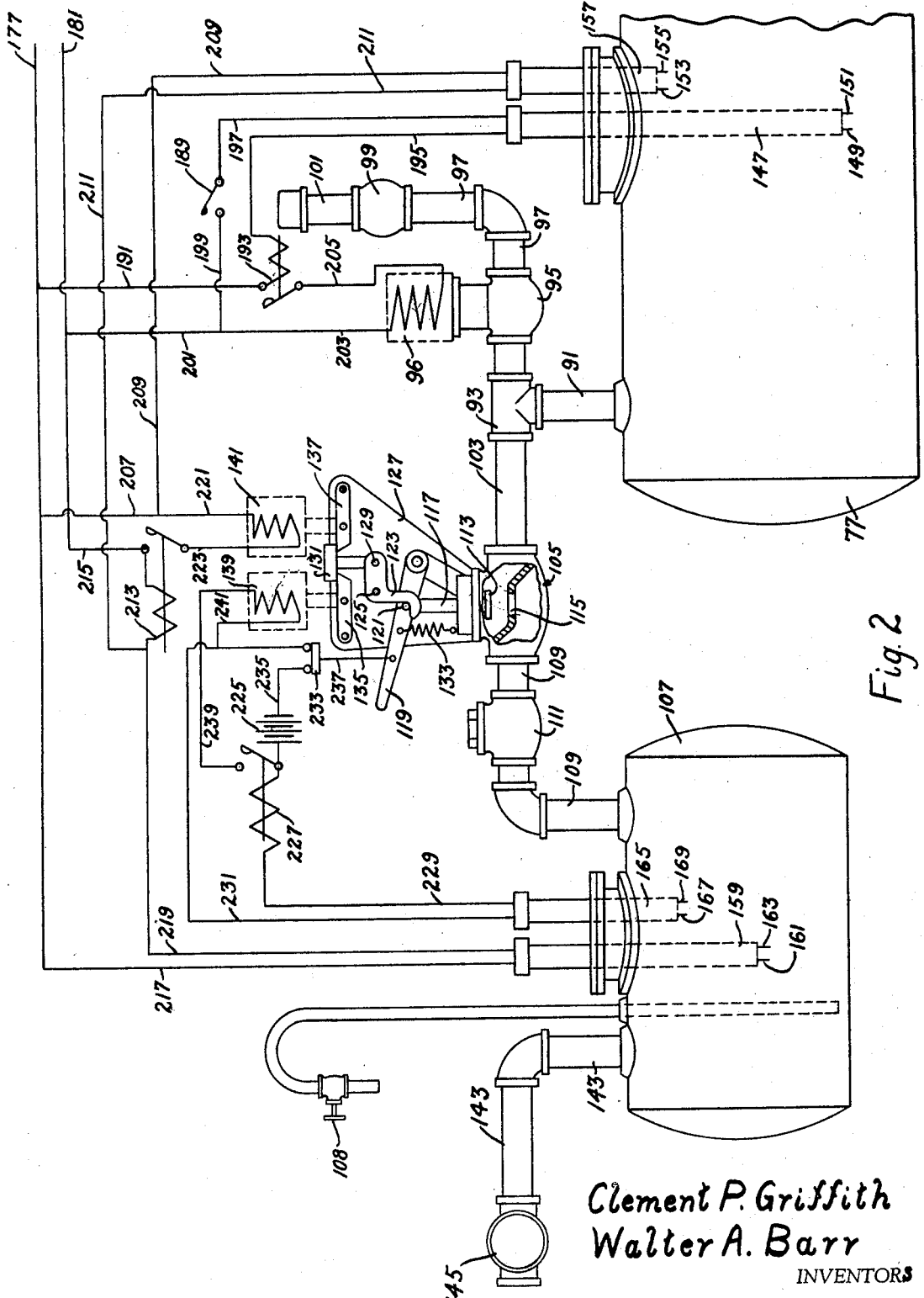
Figure 2 shows the filling and overflow control mechanism.

Referring now to Figure 2, an outlet pipe 91 is connected to the top of the tank 77 and leads to a T connection 93. One branch of the T 93 is connected to a fill valve 95 which is normally closed and is opened by a solenoid 96 when the latter is energized. The valve is in turn connected by pipe 97 to an upwardly closing check valve 99 and to a fill pipe 101 which may be capped as shown but which, for filling, may be fitted with a connection suitable for coupling to a tank car outlet or other discharge pipe.

The second branch of T 93 is connected by pipe 103 to a spring closed valve 105 and thence to the top portion of a separator chamber 107 by pipe 109 which contains a check valve 111 which is arranged to prevent flow from the tank 107 to the tank 77.

The valve 105 has a poppet 113 which controls a port 115 in the valve and which is connected to stem 117. The stem is connected to an operating lever 119 which is pivoted on the valve body. A pin 121, set in the lever, is adapted to be engaged by a latch pawl 123 which is pivotally mounted at 125 on support plate 127 and which is connected at 129 to a tripping member 131. A spring 133 connects the lever 119 with an anchor on the valve 105 and serves to urge the valve closed. The tripping member is disposed in the path of two tripping pawls 135 and 137 which are pivotally connected to the plate 127. Pawl 135 is connected to the armature of a solenoid 139 while pawl 137 is connected to the armature of a solenoid 141. Either solenoid, when energized, will trip the latch pawl 123 and release the valve handle 119 so that the spring 133 may close the valve.

The tank 107 is provided with a blow-off connection 108 through which liquid may be discharged from the bottom of the tank, and with an outlet pipe 143 which is connected to take liquid from the top of the tank. The pipe enters a header or manifold 145 which is connected by various pipes to a plurality of field dispensing stations such as, for instance, the fueling pits disclosed in the Patent Number 1,868,497 issued to Griffith et al. July 26, 1932.

Disposed in the tank 77 is an electrode holder 147 which permits the passage into the tank of control means comprising two electrodes 149 and 151. These electrodes are disposed near the bottom of the tank but preferably a slight distance above the level of the opening into pipe 75.

A second set of control means comprising electrodes 153, 155 are supported at a level near the top of the tank by a holder 157. This level is that at which it is desired to stop the inflow of the displacing liquid.

Disposed in the separator tank 107 is a holder 159 which carries control means comprising electrodes 161, 163 at a level somewhat below the center of the tank and a second holder 165 which carries control means comprising electrodes 167, 169 at a higher level in the tank but well below the inlet of pipe 143.

Electrical system

In Figure 1, the numeral 171 indicates an electric main which is connected with the input side of an isolation transformer 173.

The switches 175 represent switches which are located at the remotely placed fueling stations. They are connected in parallel between the line 177 of the output side of the tranformer and the winding of a relay 179 which is in turn connected with the other output transformer line 181 by a line 183. This constitutes circuit A. The relay is normally open and when energized closes a circuit B from line 177 through lines 185, solenoid 53, line 187, the contacts of the relay 179 and line 183 to the line 181.

Referring now to Figure 2, when the electrodes 149—151 are immersed in a current conducting liquid, and when the manual switch 189 is closed, a circuit C is set up from line 177, through 191, the winding of relay 193, line 195 to electrode 149, through the electrolyte to electrode 151, wire 197, switch 189, wires 199 and 201 to 181. The relay, which is normally open, when energized closes a circuit D from 181 through lines 201 and 203, solenoid 96, line 205, the contacts of relay 193 and line 191 to line 177. Opening switch 189 at any time deenergizes circuits C and D.

When the electrodes 153, 155 are submerged in a current conducting liquid, a circuit E is established from line 177 through 207, 209, electrode 155, the electrolyte, electrode 153, line 211, winding of normally open relay 213 and line 215 to 181.

The same relay 213 is energized when the electrodes 161 and 163 are connected by conducting liquid level rising in the tank 107. This circuit F is from line 177 through line 217, electrode 161, the electrolyte, electrode 163, line 219, the winding of relay 213, line 215 to line 181.

The relay, when energized by either circuit E or F, sets up a circuit G from line 177, through lines 207 and 221, solenoid 141, line 223, the contacts of the relay and line 215 to 183.

An auxiliary or safety circuit H is provided in the event the main power supply should fail. This circuit is from one pole of battery 225, through the winding of relay 227, line 229 to electrode 169, through the electrolyte to electrode 167, through line 231 to switch 233 and line 235 to the other pole of the battery. The switch 233 is connected by a link 237 with the handle 119 of valve 105. When the valve is open the switch is closed and vice versa.

When the relay 227 is energized, current flows in circuit I from the one pole of the battery, through the contacts of the relay, through line 239, solenoid 139, line 241, switch 233 and line 235 to the other pole of the battery. When switch 233 opens, both the circuits H and I are opened.

In practice, any desired number of storage and separator tanks with their individual filling and cut-out control mechanisms and circuits may be interposed in parallel between the two headers. In practice also, water is used as the displacement fluid and the displaced or dispensed fluid is usually lighter than water such as, for instance, gasoline or other similar liquids.

Dispensing operation

Assuming that the supply tanks 77 are in operating condition, that is, with a body of water in the bottom portion of the tank and a body of gasoline floating on the water and occupying all of the upper portion of the tank to a point below electrodes 153, 155 and with gasoline covering all of the electrodes in the separator tank 107. Preferably, the tank is so formed as to exclude any gas pockets.

The plane of contact of the two bodies of liquid will therefore be above the electrodes 149, 151 and below the electrodes 153, 155. It has been established that the gasoline is not a good electrolyte and will not pass sufficient current to actuate the relays while water such as is available at installations of this type is a relatively good conductor and will pass sufficient current to permit the relays to operate.

In this specification and in the claims the use of the words "conducting liquid" or "current conducting liquid" refers merely to the relatively better conducting quality of one liquid and does not necessarily imply that the other liquid may not have some current conducting ability.

When one of the switches 175 is closed, the circuits A and B are closed in sequence, the solenoid 53 is energized and the three-way valve 51 is actuated to connect the chamber 47 with the pipe 13 by way of pipes 49 and 55. Water under pressure being thus admitted to the chamber 47 will depress the diaphragm 41 against the action of spring 43 and will cause the valve 35 to close port 31 and the valve 33 to open the port 29. This admits water, under pressure, from chamber 15 into the passage 25, pipe 27, manifold 61 and the pipes 63 and chambers 65 of all of the manual three-way valves 67.

The valves 67 are normally set so that the poppet 85 uncovers the port 81 and the poppet 83 closes the port 79. Accordingly, the water under pressure will at once pass through the passage 73 and pipe 75 and be admitted to the bottom of the tank 77.

The valve 95 is normally closed and this and the upwardly closing check valve 99 prevent the water pressure which is applied to tank 77 from forcing gasoline out through the pipe 101.

Valve 105 is normally held open against the action of spring 133 by the latch pawl 123. Thus the water entering at the bottom of the tank 77 will force the gasoline at the top of the tank out through the pipes 91, 93, 103, valve 105, pipe 109 and valve 111 into the top of tank 107 where, due mainly to the reduction in velocity and the reversal of flow, any free water contained in the gasoline will be dropped. The gasoline will then pass out through the pipe 143, manifold 145 and its associated distributing pipes to the points of dispensing. There the flow is controlled usually by a nozzle valve which is on the end of a dispensing hose although other control means may also be used if desired. The free water will settle to the bottom of the separator tank.

As the dispensing of gasoline continues, the water-gasoline contact level will rise and eventually the electrodes 153, 155 will be submerged in the body of water. When this occurs the circuit E is established and as soon as the current in this circuit is sufficient to actuate the normally open relay 213, the circuit G is closed and the solenoid 141 is energized to trip the latch pawl 123. The valve 105 will be closed by spring 133 and further dispensing of liquid from the tank is prevented.

If the shut-off mechanism just described fails to function due to an interruption of the circuit, water will be passed into the separator tank 107. If the water-gasoline contact level rises for this reason or by reason of accumulaton of entrained water or both, the contacts 161 and 163 will eventually be submerged. This will cause the circuit F to be established and as soon as the current in this circuit is sufficient to actuate the relay 213, the circuit G will be established to energize the solenoid 141 and trip the valve 105.

If for any reason the circuits described above are rendered ineffective, the water level will continue to rise in tank 107 but before it reaches the outlet 143 it will cover the electrodes 167 and 169 and establish the auxiliary battery circuit H and when the current in this circuit becomes sufficient to energize the normally open relay 227, the battery circuit I through the solenoid 139 will be established and the valve 105 will be tripped and closed and the flow of liquid from the tank will stop.

As the valve 105 closes, the switch 233 will be opened and will break both circuits H and I so as to relieve the battery of all load.

In order to place the system which has been shut down in operation again it is necessary first to refill the tank 77. This is accomplished by operating valve 67 manually to close port 81 and to open port 79 so that the tank 77 is connected by pipe 75, passage 73 and chamber 69 to the waste pipe 71.

Connection is made between the fill pipe 101 and the source of gasoline such as a tank car or a barge line and the switch 189 is closed. Since the electrodes 149, 151 are submerged in water, the circuit C is established through the winding of the normally open relay 193 and when this closes, the circuit D is established and energizes solenoid 96 to open the normally closed valve 95.

Gasoline will pass through check valve 99, pipe 91, valve 95, T 93 and pipe 91 into the top of the tank and water will pass out of the tank through pipe 75 and the waste line 71. As this operation proceeds, the water-gasoline contact level will be lowered until eventually the electrodes 149, 151 will be submerged in gasoline to the extent that not enough current will flow in circuit C to hold the relay closed and it will open to break the circuit D. The solenoid 96 will be deenergized and the valve 95 will close.

It will then be necessary to disconnect the fill line from fill pipe 101, operate the valve 67 to close port 79 and open port 81, and if the system was shut down by water in the separator tank, it will be necessary to drain off water through the drain 108. This may be done by opening valve 108 and operating a switch 175 which is disposed adjacent the controls for convenience. This will apply pressure to tank 107 by way of manifold 145. Once water is cleared from the electrodes in both tanks 77 and 107, valve 105 will remain open so that by closing 108, opening valve 105 by lifting handle 119, and opening switch 189, the system will again be restored to operating condition.

It will be noted that when all of the switches 175 are open the circuits A and B are broken and the solenoid 53 is deenergized. Under such conditions the valve 51 occupies a position to shut off the pipe 55 and to connect the pipes 49 and 55. The chamber 47 is accordingly relieved of pressure and the spring 43 operates the valve poppets of the master valve to close port 29 and open port 31. The tanks 77 are therefore all connected to the waste pipe 23 (with the exception of those being filled with gasoline) and are relieved of all pressure except for a small water head in the pipe 75.

If the pressure in line 13 becomes excessive, the relief valve 9 will operate to reduce the pressure to within predetermined limits.

Should pressure be applied to the manifold 145 while a tank 77 is being filled, the check valve 111 will prevent such pressure from being applied to the tank 77. The check valve 99 prevents liquid from being forced up and out of the fill pipe.

It is of course obvious that to initially fill any tank 77 or to fill it after it has been emptied of liquid for purposes of repair or cleaning, it is necessary merely to remove the cap from the gauging pipe 78, to set the valve 67 closed to the drain and open to the water lines and thereafter to close a switch 175, one of which is preferably located adjacent the filling mechanism controls. Water will then enter the tank and when it rises in the gauging pipe, the water can be cut off by valve 67, the cap be replaced and the filling operation may proceed as described above.

*Single tank system*

If only a single tank 77 is to be used, the valve

67 and headers 61 and 146 can be eliminated. The pipe 75 would then be connected directly to the passage 26 of valve 17 and filling could be accomplished during the time that the passage 26 is connected to the waste pipe 23. Should any of the switches 176 be closed while the filling operation is proceeding, the check valve 99 and valve 106 will prevent liquid from leaving the system and the filling operation will simply be stopped until the valve 17 is reversed.

Modified single tank system

Figure 3:
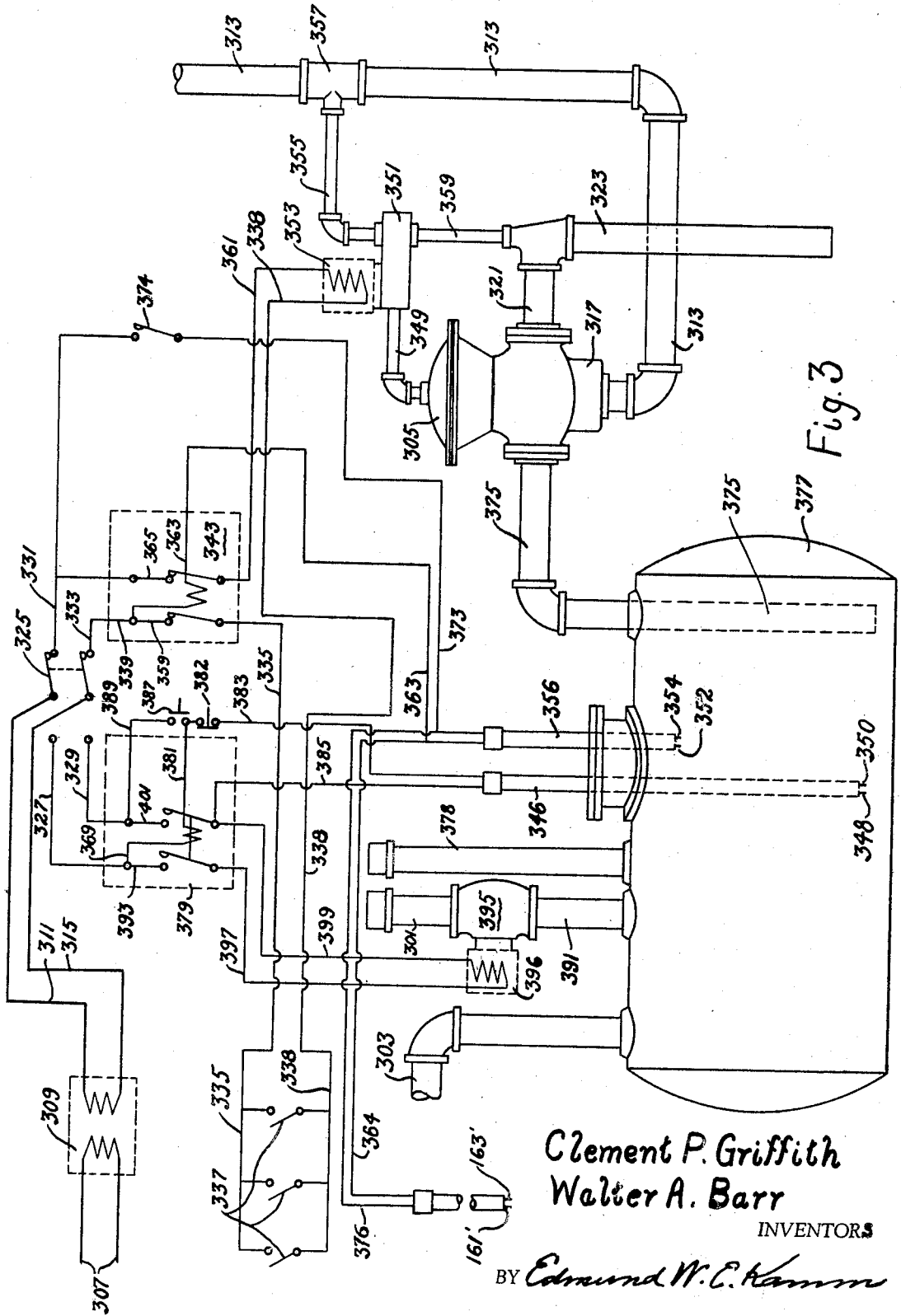
Figure 3 is a view of a modified, single storage tank system.

Referring to Figure 3, the numeral 313 refers to a line carrying displacement liquid such as water. This line is connected at the inlet end with the auxiliary controls 1, 3, 6, 7, 8, 9 and 11 of Figure 1 and at the other end with one port of a three-way, power operated master valve 317 which is in all respects similar to the valve 17, Figure 1. One outlet of the valve is connected by pipe 321 to a waste pipe 323 and the other outlet communicates by a pipe 375 with the tank 377, and where the displacement liquid is heavier than the liquid to be displaced, the pipe 375 communicates with the tank at a point adjacent the bottom of the tank while the outlet 303 for liquid being displaced is at the top of the tank. Obviously, if the displacement liquid were of less density than the displaced liquid, the position of these connections would have to be reversed. A gauging pipe 378 which is provided with a cap is connected to the top of the tank.

The motor portion 305 of the valve is connected by pipe 349 to one port of a three-way valve 351. The other ports of the valve are connected, one by pipes 355 and T 357 to the pipe 313 and the other by pipe 359 to the waste pipe 323. Solenoid 353 operates the valve from the normal position in which the motor is connected to the waste line and pipe 355 is closed to the position in which the waste line is closed and the motor is connected to liquid in the line 13.

A fill line 301, 391 contains a valve 395 which is normally closed but which is opened by solenoid 396 when it is energized.

An electrode holder 346 is provided with control means comprising electrodes 348 and 350 which are positioned in the tank slightly above the end of pipe 375. A second electrode holder 356 is fitted with control means comprising electrodes 352 and 354 which are held in the tank at a level below that of the outlet pipe 303.

Pipe 303 may lead directly to the dispensing lines but it is preferably connected to a separator tank similar to 107 in Figure 2 which is preferably fitted with control means comprising electrodes 161' and 163' similar to 161 and 163 of Figure 2, and these electrodes are preferably connected in parallel with the electrodes 352, 354 of Figure 3 by connecting electrode 163' by wire 364 to wire 363 and the other electrode 161' by wire 374 to wire 373. It is also necessary that a water discharge outlet similar to 108 of Figure 2 be provided.

the filling circuits through leads 327 and 329 or to the dispensing circuits through leads 331 and 333.

The first dispensing circuit M runs from the line 333, through 339 and 350 through one set of contacts of a normally closed relay 343, through wire 335 to one side of a plurality of parallel connected switches 337 most of which are located at the dispensing stations, one of which may be located near the filling controls for special operation, through one of the switches, through line 338, through solenoid 353 of the water control valve 351, through line 361, through the other set of contacts of relay 343, line 365 to line 331.

The control circuit N for relay 343 starts at line 333, passes through the winding of the relay, through line 363, electrodes 352, 354, line 373, switch 374 to line 331. This circuit is extended by wires 376 and 364 to the separator tank electrodes 161' and 163' which are connected in parallel with electrodes 354 and 352 respectively.

A first filling circuit O, runs from line 327, through 369, through the winding of a normally open relay 379, through 381, normally open push button switch 387, line 389 to 329.

The second circuit P, runs from line 327, through 393, through one set of contacts of relay 379, line 397, solenoid 396 of the fill valve 395, line 399 through the other set of contacts of the relay, line 401 and to line 329.

A third circuit Q runs from line 327, through 369, the winding of the relay, line 381, normally closed push button 382, line 383, electrodes 350, 348, line 385 to the movable, right-hand contact of relay 379, 401 to 329. This circuit forms a holding circuit for the normally open relay 379.

Operation

Assuming that the tank 377 contains liquid to be dispensed, in order to initiate dispensing it will be necessary to shift the switch 325 to energize lines 331, 333 and to see that switch 374 is closed. Thereafter, closing of any of the service switches 337 will energize circuit M described above and the solenoid 351 so that the waste line 359 will be closed and water under pressure will be applied to the motor 305.

Operation of the motor and valve 317 closes the waste line 321 and admits water under pressure to tank 377 through pipe 375 and as a result the gasoline which is above the water will be forced from the tank through pipe 303 when a service outlet is opened, whence it will pass through a separator like 107 (Figure 2) and out to the dispensing nozzles.

Dispensing may be continued until the water level in the tank submerges electrodes 352, 354, or electrodes 161', 163' in the separator, whereupon circuit N will be closed and the winding of the relay 343 will be energized, the relay will be opened to deenergize circuit M including solenoid 353 so that valve 351 will cut off the water pressure and connect motor 305 to waste, valve ing of the relay 370 to close the contacts thereof which results in the energization of both the circuits P and Q. Circuit P causes the valve 395 to be opened so that gasoline may flow into the tank while water is displaced through pipe 375 and valve 317 to the sewer. The circuit Q is established through the winding of the relay upon closing of the contacts and maintains the contacts thereof, and consequently, the circuit P closed.

The filling operation may be terminated at will by opening circuit Q through momentarily depressing the switch button 382. Filling may again be started by pressing the starter button 387.

Filling will be stopped automatically when the water level in the tank is depressed below the electrodes 349, 350 so that the latter will be submerged in gasoline. This interrupts the holding circuit Q and consequently deenergizes the relay windings and the circuit P is opened and valve 395 closes.

If at any time during dispensing, water should accumulate in the separator tank to a sufficient height to close the electrodes 161', 163', the result would be to energize the circuit N comprising the lines 376, 364, 373, 363 and the winding of relay 343 so that the contacts of the relay will be opened. The circuit M would be thereby deenergized. Valves 351 and 317 would then shift to their inactive positions and stop dispensing.

In filling the tank 377 initially or after cleaning or repairs, it is necessary to shift switch 325 to energize lines 331, 333 to open the gauging pipe 378 and switch 374. Thereupon, operation of a service switch 337, one of which is preferably located near the filling controls, will apply water under pressure to the tank and the air will be driven out the gauging pipe 378. When water rises in the pipe, the service switch may be opened and the gauging pipe and switch 374 closed. Thereafter, the tank may be refilled as described above.

It is obvious that various changes may be made in the form, structure, and arrangement of parts without departing from the spirit of the invention. Accordingly, applicants do not desire to be limited to the specific embodiment disclosed herein primarily for purposes of illustration; but instead, they desire protection falling fairly within the scope of the appended claims.

What we claim to be new and desire to protect by Letters Patent of the United States is:

1. In a liquid dispensing system, the combination of a tank for storing the liquid to be dispensed, a displacement liquid inlet for said tank, a dispensing outlet in said tank, a separator connected with said outlet, and a valve disposed between said tank and separator, valve closing means, comprising control means in both said separator and said tank adapted to be actuated by a predetermined maximum level of displacement liquid, for closing said valve.

2. In a liquid dispensing system, the combination of a tank for storing the liquid to be dispensed, a displacement liquid inlet for said tank, a dispensing outlet in said tank, a separator connected with said outlet, and a valve disposed between said tank and separator, valve closing means, comprising control means in both said separator and said tank actuated by predetermined levels of displacement liquid, for closing said valve, and additional control means for closing said valve when displacement liquid attains a different predetermined level in said separator.

3. In a liquid dispensing system, the combination of a tank for storing the liquid to be dispensed, a displacement liquid inlet for said tank, a dispensing outlet in said tank, a separator connected with said outlet, and a valve disposed between said tank and separator, automatic valve closing means, comprising control means in both said separator and said tank actuated by predetermined levels of displacement liquid, for closing said valve and manual means for opening said valve.

4. In a liquid dispensing system, the combination of a tank for storing the liquid to be dispensed, a displacement liquid inlet for said tank, a dispensing outlet in said tank, a separator connected with said outlet, and a valve disposed between said tank and separator, valve closing means, comprising control means in both said separator and said tank actuated by a predetermined maximum level of displacement liquid, for closing said valve, and additional control means for closing said valve when said displacement liquid attains a different predetermined level in said separator, and means actuated by said valve upon closing thereof for rendering said additional control means inoperative.

5. In a liquid dispensing system the combination of a tank for storing liquid to be dispensed, a displacement liquid inlet for said tank, a dispensing outlet in said tank, a separator connected with said outlet, a valve disposed between said tank and said separator, valve closing means, means for holding said valve open, means responsive to an accumulation of current conducting liquid in said separator for disabling said holding means and for keeping it disabled until the level of said liquid is lowered.

6. In a liquid dispensing system, the combination of a tank for the liquid to be dispensed, a source of displacement liquid, means operable at will to introduce displacement liquid into said tank, a separator connected to and disposed to receive liquid dispensed from said tank, and means connected between said tank and separator for stopping the dispensing of liquid from said tank comprising electrically actuated means, under the control of electrodes disposed in said separator, through which electrodes a current flows when said electrodes are connected by current conducting liquid in said separator.

7. In a liquid dispensing system, the combination of a tank for storing liquid to be dispensed, means for connecting said tank to a source of displacement liquid or to waste, means for filling said tank with liquid to be dispensed comprising a liquid inlet, a normally closed valve in said inlet, a solenoid adapted, when energized, to open said valve, a circuit comprising said solenoid and the contacts of a relay, a normally open circuit operable manually to close said relay and energize said first circuit and the solenoid, and a holding circuit for said relay comprising the winding of the relay and a pair of electrodes disposed in said tank at the minimum level of displacement liquid whereby said circuits will be broken and said valve will close when said level is reached.

8. In a liquid dispensing system, the combination of a tank for storing liquid to be dispensed, a waste line, means normally connecting said tank and waste line but operable to connect said tank to a source of displacement liquid, means for introducing displacement liquid into said tank comprising a control valve, a solenoid for operating said valve, dispensing circuits for controlling said valve, one circuit comprising the contacts of a normally closed relay and a normally open control switch and a second circuit comprising the winding of said relay and electrodes disposed at the maximum level of displacement liquid in the tank, means for filling said tank with liquid to be dispensed comprising an inlet having a normally closed valve and a solenoid for opening said valve, circuits for controlling the filling of said tank including a first circuit comprising said solenoid and the contacts of a normally open relay, a holding circuit comprising the winding of said normally open relay and electrodes disposed at the minimum level of displacement liquid, and a starting circuit comprising a normally open switch and the winding of said normally open relay, an electric power line, and a selector switch adapted to connect either the filling control circuits or the dispensing control circuits to the power line.

9. In a liquid dispensing system, the combination of a tank for the liquid to be dispensed, a dispensing outlet for said tank, a shut-off valve in said outlet, a water separator connected to said valve, means for urging said valve toward closed position, latch means for holding said valve open, electrodes disposed in said tank and said separator, power means controlled by said electrodes and adapted to release said latch means upon contact of the electrodes with water either in said tank or in said separator, and an auxiliary latch releasing means for said shut-off valve, comprising battery actuated means controlled by electrodes inserted in said separator but disposed to be actuated by a higher level of water than said first mentioned electrodes.

10. In a liquid dispensing system, the combination of a tank for the liquid to be dispensed, a dispensing outlet for said tank, a valve in said outlet, a water separator connected to said valve, means for urging said valve toward closed position, latch means for holding said valve open, electrodes disposed in said tank and said separator, power means controlled by said electrodes and adapted to release said latch means upon contact of the electrodes with water either in said tank or in said separator.

11. In a liquid dispensing system, the combination of a tank for the liquid to be dispensed, a dispensing outlet for said tank, a shut-off valve in said outlet, a water separator connected to said valve, means for urging said valve toward closed position, latch means for holding said valve open, electrodes disposed in said tank and said separator, power means controlled by said electrodes and adapted to release said latch means upon contact of the electrodes with water either in said tank or in said separator, and an auxiliary latch releasing means for said valve comprising battery actuated means controlled by electrodes inserted in said separator but disposed to be actuated by a higher level of water than said first mentioned electrodes, and means controlled by said valve upon closing for disconnecting said battery actuated means.

CLEMENT P. GRIFFITH.
WALTER A. BARR.